Dec. 13, 1960 E. N. KELLOGG 2,963,812
FISH LURE
Filed Dec. 15, 1958
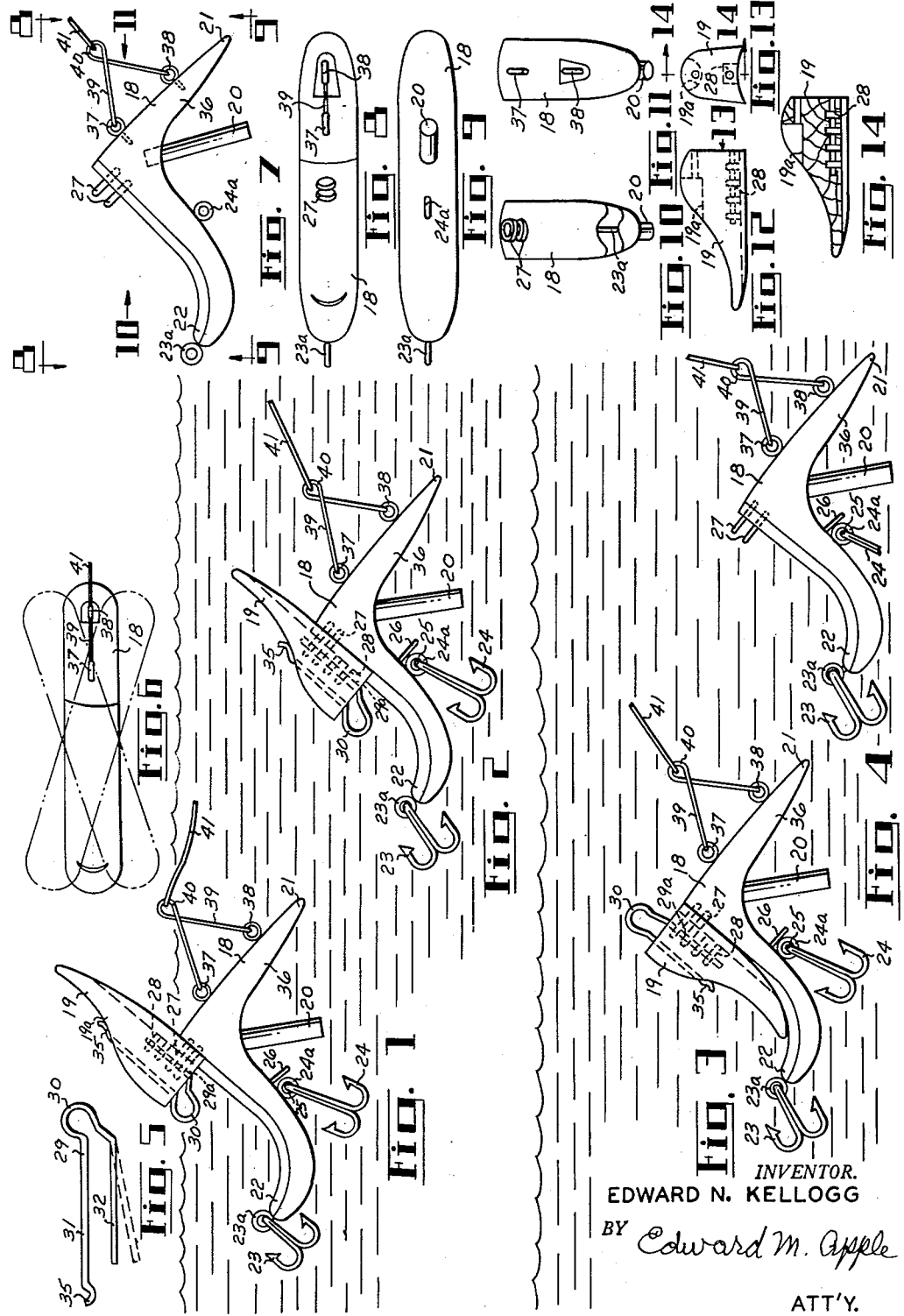
INVENTOR.
EDWARD N. KELLOGG
BY Edward M. Apple
ATT'Y.

United States Patent Office 2,963,812
Patented Dec. 13, 1960

2,963,812

FISH LURE

Edward N. Kellogg, 615 Springport Road,
Harrisville, Mich.

Filed Dec. 15, 1958, Ser. No. 780,397

4 Claims. (Cl. 43—42.22)

This invention relates to fishing tackle and has particular reference to a fish lure embodying a "piggy-back" construction, suitable for use in the operations of casting and trolling.

An object of the invention is to generally improve fish lures, and to provide a device of that character, which is simple in construction, economical to manufacture, and efficient in operation.

Another object of the invention is to provide a fish lure, which is readily adaptable for use in shallow, medium, or deep water operations.

Another object of the invention is to provide a fish lure, which has unique action when used in the water, whereby it will be tantalizingly attractive to the fish when viewed from above, below, or from the side.

Another object of the invention is to provide a fish lure, which is made up of at least two buoyant body parts, which are adjustable with respect to one another, whereby different work patterns may be effected in the water.

Another object of the invention is to provide a fish lure, which is constructed and arranged so that it may effect a deep, medium, or shallow dive, with controllable, wide or narrow, fast or slow, lateral action.

Another object of the invention is to provide a device of the character indicated, which is provided with a stabilizer, which prevents the lure from turning on its back in the water, and adds weight to improve its casting facility.

Another object of the invention is to provide a fish lure, which is constructed with particular body contours, which prevents the tangling of the hooks when the lure is being cast.

Another object of the invention is the provision of a fish lure with novel means for attaching thereto the fish line.

Another object of the invention is to provide a fish lure of the character indicated, with novel means for securing in adjustable relation to one another, the two body portions of the lure, so that qiuck and easy adjustments may be effected.

Another object of the invention is to provide a fish lure, which is constructed and arranged so that the normal downward thrust of the lure body, when it is pulled through the water, is counteracted by an adjustable projection, which serves in the nature of a fin.

The foregoing and other objects and advantages of the invention will become more apparent as the description proceeds, reference being made from time to time to the accompanying drawings, forming part of the within disclosure, in which drawings:

Fig. 1 is a side elevational view of the lure adjusted for near the surface, or shallow water use.

Fig. 2 is a side elevational view of the lure adjusted for medium depth operation.

Fig. 3 is a side elevational view of the device, with the "piggy-back" portion of the body reversed, to effect a deeper action in the water.

Fig. 4 is a side elevational view of the device, with the "piggy-back" portion of the body removed, to effect the sinking of the lure to the bottom of the body of water, and to effect a deeper action when the lure is trolled.

Fig. 5 is an enlarged fragmentary detail of the spring wire clip, which is used to secure the main portions of the body together.

Fig. 6 is a diagrammatic view, illustrating, with broken lines, a typical lateral action of the lure when in use.

Fig. 7 is a side elevational view of the lower portion of the fish lure body, without the hooks, and with the "piggy-back" portion of the lure body removed.

Fig. 8 is a top plan view taken substantially on the line 8—8 of Fig. 7.

Fig. 9 is a bottom plan view taken on the line 9—9 of Fig. 7.

Fig. 10 is a left end view looking in the direction of the arrow 10 in Fig. 7.

Fig. 11 is a right end view looking in the direction of the arrow 11 in Fig. 7.

Fig. 12 is an elevational detail of the "piggy-back" portion of the lure body.

Fig. 13 is an end view of the "piggy-back" portion of the lure body looking in the direction of the arrow 13 in Fig. 12.

Fig. 14 is a section taken substantially on the line 14—14 of Fig. 13.

Referring now more particularly to the drawings, it will be understood that in the embodiment herein disclosed, the reference character 17 indicates the surface of a body of water in which the fish lure embodying the invention is to be used.

The fish lure embodying the invention consists of a buoyant body portion 18, and a second buoyant body portion 19, which is carried on the body portion 18, in "piggy-back" manner, as hereinafter described. The body portions 18 and 19 are preferably made of buoyant material, such as wood, plastic, or the like. Depending from the underside of the body portion 18, and rigidly secured thereto by any suitable means, is a metallic rod 20, which serves as a counter-weight and stabilizer for the lure body. This prevents the lure body from turning on its back when the lure is drawn in the water, and provides additional weight to the lure body to assist in casting the lure a greater distance.

The body portion 18 of the lure is substantially L shaped, one leg of which L terminates in a tapered end 21, and the other end of which L terminates in the upwardly directed curved end 22. Gangs of hooks 23 and 24 are preferably mounted on the body portion 18, by means of screw eyes 23A and 24A, as shown. I prefer to mount the hooks 24 at the end of a spreader 25, so that there is a gang of hooks positioned outwardly on either side of the lure body. A stop member 26 prevents the spreader 25 from rotating about its pivot point.

The body portion 18 is provided with a pair of screw eyes 27, which are arranged to be received in a plurality of slots 28, formed in the underside of the "piggy-back" portion 19, of the fish lure body. A spring clip 29, Fig. 5, having a hand grip portion 30, and legs 31 and 32, is arranged to slidably move in longitudinal bores 33 and 34 formed in the "piggy-back" portion 19 of the lure body. The lower longitudinal slot 29A is in alignment with the openings in the screw eyes 27, so that the short leg 32 of the spring clip 29 may engage the screw, eyes, to lock the two body parts together. The bent end 35, of the leg 31, of the spring clip 29 impinges against the upper face of the "piggy-back" portion 19 in a recess 19A, (Figs. 12 and 13), formed therein, whereby to prevent the spring clip 29 from being withdrawn from the body portion 19. It will be noted that the leg 32, of the clip 29, (Fig. 5), is shorter than the leg 31 so that the clip 29 may be withdrawn from engagement with the screw eyes 27 to release the "piggy-back" portion 19 from the lower portion 18 of the lure body.

The leg 36, of the body portion 18, is provided with screw eyes 37 and 38, to which are secured the legs of a V shaped wire member 39, to the eye 40 of which is secured the fish line 41, which in turn is secured to the fish rod (not shown). The V shaped wire member 39 engages the screw eyes 37 and 38, so that the fish lure body is laterally pivotable thereon. This provides the fish lure body with its freely swinging lateral movement.

In operation, the "piggy-back" portion 19 of the lure body may be positioned as shown in Fig. 1, in which position the overhanging part of the "piggy-back" portion 19, serves to greatly counter-act the downward thrust of the leg 36 of the body portion 18, as the device is drawn through the water. This causes the lure to stay near the surface of the water, but permits the lure body to swing laterally on the V shaped wire member 39. In this position the bait will float in upright position, when not being pulled, and when the pulling starts, the lure will commence a noisy surface action and will continue its action partly below the water surface.

When the "piggy-back" 19 is positioned, as shown in Fig. 2, the overhanging portion thereof offers less resistance to the downward thrust of the leg portion 36 of the lure body, with the result that the lure will assume an upright position in the water, but will still move in an oscillating lateral manner, on the V shaped wire member 39.

When the "piggy-back" portion 19 is reversed, as shown in Fig. 3, little resistance is offered to the downward thrust of the body portion 18, and the lure will operate at a deeper level in the water when pulled; however, when not being pulled through the water, the bait will float in an upright position.

When the "piggy-back" portion 19 is removed from the body portion 18, as shown in Fig. 4, the lure will have less buoyancy and will tend to sink to the bottom of the body of water, making it possible to start its lateral, oscillating movement at, or near, the bottom of the lake or stream.

It will be understood that the acceleration of movement, and lateral action of the lure, can be changed and controlled by changing the length ratio of the legs of the wire member 39, resulting in a fast action with the lure moving in small arcs, or a slower action with the lure moving in wider arcs.

Changing the length ratio of the wire legs of the member 39 also changes the pitch and thrust tendency of the leg portion 36 of the lure body in the water.

It is obvious, therefore, that a fish lure constructed and manipulated in the maner hereinbefore described, will move in the water in an alluring and tantalizing manner to attract the fish.

Having described my invention, what I claim and desire to secure by Letters Patent is:

1. A fish lure comprising a main body portion of buoyant material and a "piggy-back" portion of like material, the said "piggy-back" portion being adjustable with respect to the main body portion, and means to effect such adjustment, said main body portion being substantially of an inverted L shape, one leg of said L terminating in a sharp taper, and the other leg of said L terminating in an upwardly curved and rounded end, there being a fixed cylindrical counter-weight on the under side of said L shaped body between said legs.

2. A fish lure comprising a main body portion of buoyant material and a "piggy-back" portion of like material, the said "piggy-back" portion being adjustable with respect to the main body portion, and means to effect such adjustment, said main body portion being substantially in the form of an inverted L, the leading leg of which L terminates in a tapered end, and the trailing leg of which L terminates in an upwardly curved and rounded end, there being a flat surface on the leading face of said leading leg, screw eyes positioned on said flat surface, and a V shaped wire member pivotably secured at its ends to said screw eyes.

3. A fish lure comprising a main body portion of buoyant material and a "piggy-back" portion of like material, the said "piggy-back" portion being adjustable with respect to the main body portion, and means to effect such adjustment, said body portion having recesses formed therein, and said adjustment means including screw eyes on the upper face of said main body portion, adapted to be received in recesses formed in said "piggy-back" portion, there being bores formed in said "piggy-back" portion, in communication with said recesses, and a spring wire clip having legs to be received in said bores, one of said legs also being receivable in said screw eyes to lock said "piggy-back" portion to said main body portion.

4. A fish lure comprising a main body portion of buoyant material and a "piggy-back" portion of like material, the said "piggy-back" portion being adjustable with respect to the main body portion, and means to effect such adjustment, said body portion having recesses formed therein, and said adjustment means including screw eyes on the upper face of said main body portion, to be received in recesses formed in said "piggy-back" portion, there being bores formed in said "piggy-back" portion, in communication with said recesses, and a spring wire clip having legs to be received in said bores, one of said legs also being receivable in said screw eyes to lock said "piggy-back" portion to said main body portion, and means cooperating between said spring wire clip and said "piggy-back" portion to prevent the displacement of said spring wire clip.

References Cited in the file of this patent

UNITED STATES PATENTS

| | | |
|---|---|---|
| 2,243,663 | Wareham | May 27, 1941 |
| 2,476,006 | Townsend | July 12, 1949 |
| 2,503,369 | Wycech | Apr. 11, 1950 |
| 2,575,626 | Isaac | Nov. 20, 1951 |
| 2,694,876 | Grasser | Nov. 23, 1954 |
| 2,749,646 | Hall | June 12, 1956 |